(12) United States Patent
Hudgens et al.

(10) Patent No.: US 9,033,644 B2
(45) Date of Patent: May 19, 2015

(54) BOOM DRIVE APPARATUS, MULTI-ARM ROBOT APPARATUS, ELECTRONIC DEVICE PROCESSING SYSTEMS, AND METHODS FOR TRANSPORTING SUBSTRATES IN ELECTRONIC DEVICE MANUFACTURING SYSTEMS WITH WEB EXTENDING FROM HUB

(71) Applicant: Applied Materials, Inc., Santa Clara, CA (US)

(72) Inventors: Jeffrey C. Hudgens, San Francisco, CA (US); Izya Kremerman, Los Gatos, CA (US); Jeffrey A. Brodine, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 210 days.

(21) Appl. No.: 13/923,741

(22) Filed: Jun. 21, 2013

(65) Prior Publication Data
US 2014/0010625 A1 Jan. 9, 2014

Related U.S. Application Data

(60) Provisional application No. 61/668,118, filed on Jul. 5, 2012.

(51) Int. Cl.
*B25J 9/04* (2006.01)
*B25J 18/00* (2006.01)
(Continued)

(52) U.S. Cl.
CPC ............... *B25J 18/00* (2013.01); *Y10S 901/14* (2013.01); *Y10T 74/20335* (2015.01); *Y10T 74/20329* (2015.01); *B25J 9/0009* (2013.01); *B25J 9/043* (2013.01); *B25J 9/104* (2013.01)

(58) Field of Classification Search
CPC ............ B25J 9/043; B25J 9/104; B25J 9/0009
USPC ................................. 414/744.5, 935
See application file for complete search history.

(56) References Cited

U.S. PATENT DOCUMENTS

| 4,597,708 A | 7/1986 | Wheeler et al. |
| 5,584,647 A | 12/1996 | Uehara et al. |

(Continued)

FOREIGN PATENT DOCUMENTS

| JP | H07-142551 | 6/1995 |
| JP | H10-247674 | 9/1998 |

(Continued)

OTHER PUBLICATIONS

International Preliminary Report on Patentability of International Application No. PCT/US2013/047034 mailed Jan. 15, 2015.

(Continued)

*Primary Examiner* — Gerald McClain
(74) *Attorney, Agent, or Firm* — Dugan & Dugan, PC

(57) ABSTRACT

Boom drive apparatus for substrate transport systems and methods are described. The boom drive apparatus is adapted to drive one or more multi-arm robots rotationally mounted to the boom to efficiently put or pick substrates. The boom drive apparatus has a boom including a hub, a web, a first pilot above the web, and a second pilot below the web, a first driving member rotationally mounted to the first pilot, a second driving member rotationally mounted to the second pilot, a first driven member rotationally mounted to the boom above the a web, a second driven member rotationally mounted to the boom below the a web, and a first and second transmission members coupling the driving members to driven members located outboard on the boom. Numerous other aspects are provided.

18 Claims, 13 Drawing Sheets

(51) Int. Cl.
B25J 9/00 (2006.01)
B25J 9/10 (2006.01)

(56) References Cited

U.S. PATENT DOCUMENTS

| | | | |
|---|---|---|---|
| 5,765,444 A | 6/1998 | Bacchi et al. | |
| 5,954,472 A | 9/1999 | Hofmeister et al. | |
| 6,105,454 A | 8/2000 | Bacchi et al. | |
| 6,189,404 B1 * | 2/2001 | Hatake et al. | 414/744.5 |
| 6,543,306 B1 * | 4/2003 | Wakabayashi et al. | 414/744.2 |
| 6,669,434 B2 | 12/2003 | Namba et al. | |
| 6,826,977 B2 | 12/2004 | Grover et al. | |
| 7,955,043 B2 | 6/2011 | Nakao | |
| 8,136,422 B2 | 3/2012 | Kitahara et al. | |
| 8,156,840 B2 * | 4/2012 | Tange | 901/23 |
| 8,651,796 B2 * | 2/2014 | Hosek et al. | 414/744.5 |
| 8,784,033 B2 * | 7/2014 | Kremerman et al. | 414/744.5 |
| 2001/0036398 A1 | 11/2001 | Hofmeister | |
| 2002/0094265 A1 | 7/2002 | Momoki et al. | |
| 2002/0150459 A1 | 10/2002 | Fujii et al. | |
| 2005/0095111 A1 | 5/2005 | Kim et al. | |
| 2006/0099063 A1 | 5/2006 | Pietrantonio et al. | |
| 2006/0216137 A1 | 9/2006 | Sakata et al. | |
| 2006/0245905 A1 | 11/2006 | Hudgens | |
| 2007/0116549 A1 | 5/2007 | Rice et al. | |
| 2007/0217896 A1 | 9/2007 | Kim et al. | |
| 2008/0063504 A1 | 3/2008 | Kroetz et al. | |
| 2008/0298945 A1 | 12/2008 | Cox et al. | |
| 2009/0087288 A1 | 4/2009 | Hofmeister et al. | |
| 2010/0178135 A1 | 7/2010 | Laceky et al. | |
| 2010/0178146 A1 | 7/2010 | Kremerman et al. | |
| 2010/0178147 A1 | 7/2010 | Kremerman et al. | |
| 2012/0063874 A1 * | 3/2012 | Kremerman | 414/744.3 |
| 2012/0141235 A1 | 6/2012 | Krupyshe et al. | |
| 2012/0189419 A1 * | 7/2012 | Yazawa et al. | 414/744.2 |
| 2013/0039726 A1 | 2/2013 | Brodine et al. | |
| 2013/0115028 A1 | 5/2013 | Kremerman et al. | |
| 2013/0149076 A1 | 6/2013 | Cox et al. | |
| 2013/0272823 A1 * | 10/2013 | Hudgens et al. | 901/29 |
| 2014/0271055 A1 * | 9/2014 | Weaver et al. | 901/29 |

FOREIGN PATENT DOCUMENTS

| | | | |
|---|---|---|---|
| JP | 11-016981 | 1/1999 | |
| JP | H11-277467 | 10/1999 | |
| JP | 2000-072248 | 3/2000 | |
| JP | 2002-158272 | 5/2002 | |
| JP | 2002-172571 | 6/2002 | |
| JP | 2004-288720 | 10/2004 | |
| JP | 2005-186259 | 7/2005 | |
| JP | 2007-130733 | 5/2007 | |
| JP | 2008-235836 | 10/2008 | |
| JP | 2008-272864 | 11/2008 | |
| JP | 2009-540613 | 11/2009 | |
| JP | 2010-166083 | 7/2010 | |
| JP | 2011045945 A | * | 3/2011 |
| WO | WO 2006-109791 | | 10/2012 |

OTHER PUBLICATIONS

Notice to File Corrected Application Papers of U.S. Appl. No. 12/684,780 mailed Jan. 29, 2014.
Supplemental Amendment submitted with filing of RCE of U.S. Appl. No. 12/684,780 filed Feb. 24, 2014.
Notice of Allowance of U.S. Appl. No. 12/684,780 mailed Mar. 6, 2014.
Jun. 28, 2013 Reply to Mar. 22, 2013 Final Office Action of U.S. Appl. No. 12/684,780.
Advisory Action of U.S. Appl. No. 12/684,780 mailed Jul. 8, 2013.
Interview Summary of U.S. Appl. No. 12/684,780 filed Jul. 9, 2013.
Office Action of U.S. Appl. No. 12/684,780 mailed Aug. 9, 2013.
Notice of Allowance of U.S. Appl. No. 12/684,780 mailed Nov. 22, 2013.
Nov. 5, 2013 Reply to Aug. 9, 2013 Office Action of U.S. Appl. No. 12/684,780.
International Search Report and Written Opinion of International Application No. PCT/US13/47034 mailed Sep. 6, 2013.
International Search Report and Written Opinion of International Application No. PCT/US2010/020477 mailed Jun. 28, 2010.
International Preliminary Report on Patentability of International Application No. PCT/US2010/020477 mailed Jul. 21, 2011.
Office Action of U.S. Appl. No. 12/684,780 mailed Nov. 30, 2012.
Feb. 27, 2013 Reply to Nov. 30, 2012 Office Action of U.S. Appl. No. 12/684,780.
Final Office Action of U.S. Appl. No. 12/684,780 mailed Mar. 22, 2013.
Chinese Search Report of Chinese Patent Application No. 201080008862.9 dated Mar. 11, 2013.
Applicant-Initiated Interview Summary of U.S. Appl. No. 12/684,780 mailed May 31, 2013.

* cited by examiner

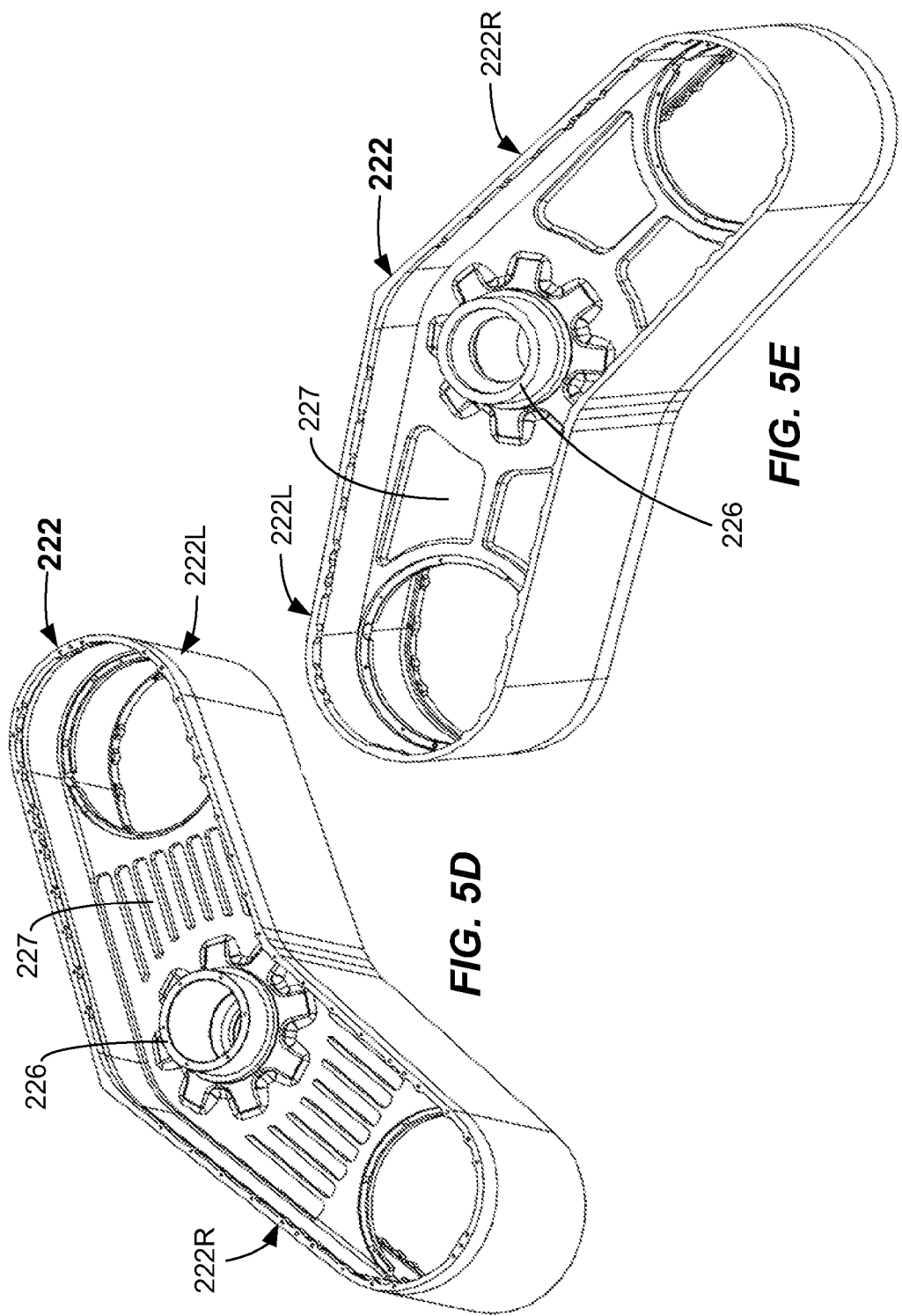

BOOM DRIVE APPARATUS, MULTI-ARM ROBOT APPARATUS, ELECTRONIC DEVICE PROCESSING SYSTEMS, AND METHODS FOR TRANSPORTING SUBSTRATES IN ELECTRONIC DEVICE MANUFACTURING SYSTEMS WITH WEB EXTENDING FROM HUB

RELATED APPLICATION

This claims priority to U.S. Provisional Patent Application No. 61/668,118, filed on Jul. 5, 2012, entitled "BOOM DRIVE APPARATUS, MULTI-ARM ROBOT APPARATUS, ELECTRONIC DEVICE PROCESSING SYSTEMS, AND METHODS FOR TRANSPORTING SUBSTRATES IN ELECTRONIC DEVICE MANUFACTURING SYSTEMS", the disclosure of which is hereby incorporated by reference herein in its entirety.

FIELD

The present invention relates to electronic device manufacturing, and more specifically to apparatus, systems, and methods for transporting substrates.

BACKGROUND

Conventional electronic device manufacturing systems may include multiple process chambers and load lock chambers. Such chambers may be included in cluster tools where a plurality of chambers may be provided about a transfer chamber, for example. These systems and tools may employ a robot, which may be housed in the transfer chamber, for example, to transport substrates between the various process chambers and load lock chambers. For example, the robot may transport substrates from process chamber to process chamber, from load lock chamber to process chamber, and/or from process chamber to load lock chamber. Efficient and precise transport of substrates between the various system chambers may be desirable for improving system throughput, thus lowering overall operating costs.

Accordingly, systems, apparatus, and methods for efficient and precise movement of substrates are desired.

SUMMARY

In one aspect, a boom drive apparatus is provided. The boom drive apparatus includes a boom including a hub, a web extending from the hub, the hub having a first pilot extending in a first direction above the web, and a second pilot extending in a second direction below the web, a first driving member rotationally mounted to the first pilot, a second driving member rotationally mounted to the second pilot, a first driven member rotationally mounted to the boom above the web at a first outboard location, a second driven member rotationally mounted to the boom below the web at a second outboard location, a first transmission member coupling the first driving member to the first driven member above the web, and a second transmission member coupling the second driving member to the second driven member below the web.

In another aspect, a robot apparatus is provided. The robot apparatus includes a boom drive apparatus having a boom adapted to be rotated about a primary rotational axis, the boom including a hub, a web extending radially from the hub, the hub having a first pilot extending in a first direction above the web, and a second pilot extending in a second direction below the web, a first driving member rotationally mounted to the first pilot, a second driving member rotationally mounted to the second pilot, a first driven member rotationally mounted to the boom at a first outboard end above the web, a second driven member rotationally mounted to the boom at the first outboard end below the web, a first transmission member coupling the first driving member to the first driven member above the web, and a second transmission member coupling the second driving member to the second driven member below the web, a first multi-arm robot rotationally coupled to the boom at the first outboard end, the first multi-arm robot having a first upper arm coupled to the first driven member, a first forearm, a first wrist member, and a first end effector adapted to support a first substrate, and a second multi-arm robot rotationally coupled to the boom at the first outboard end, the second multi-arm robot having a second upper arm coupled to the second driven member, a second forearm, a second wrist member, and a second end effector adapted to support a second substrate.

In another aspect, an electronic device processing system is provided. The system includes a transfer chamber, a robot apparatus received in the transfer chamber and adapted to transport multiple substrates, the robot apparatus having a boom drive apparatus having a boom adapted to be rotated about a primary rotational axis, the boom including a hub, a web extending radially from the hub, the hub having a first pilot extending in a first direction above the web, and a second pilot extending in a second direction below the web, a first driving member rotationally mounted to the first pilot, a second driving member rotationally mounted to the second pilot, a first driven member rotationally mounted to the boom at an outboard end above the web, a second driven member rotationally mounted to the boom at an outboard end below the web, a first transmission member coupling the first driving member to the first driven member above the web, and a second transmission member coupling the second driving member to the second driven member below the web, a first multi-arm robot rotationally coupled to the boom at the first outboard end, the first multi-arm robot having a first upper arm coupled to the first driven member, a first forearm, a first wrist member, and a first end effector adapted to support a first substrate, and a second multi-arm robot rotationally coupled to the boom at the first outboard end, the second multi-arm robot having a second upper arm coupled to the second driven member, a second forearm, a second wrist member, and a second end effector adapted to support a second substrate In another aspect, a method of transporting substrates within an electronic device processing system is provided. The method includes providing a boom drive apparatus having a boom including a hub, a web extending radially from the hub, the hub having a first pilot extending in a first direction above the web, and a second pilot extending in a second direction below the web, a first driving member rotationally mounted to the first pilot, a second driving member rotationally mounted to the second pilot, a first driven member rotationally mounted to the boom at a first outboard end above the web, a second driven member rotationally mounted to the boom at a first outboard end below the web, a first transmission member coupling the first driving member to the first driven member above the web, and a second transmission member coupling the second driving member to the second driven member below the web, coupling a first multi-arm robot to the first outboard end of the boom, coupling a second multi-arm robot to the first outboard end of the boom, driving the first multi-arm robot by driving the first driving member, and driving the second multi-arm robot by driving the second driving member.

Numerous other aspects are provided in accordance with these and other embodiments of the invention. Other features and aspects of embodiments of the present invention will become more fully apparent from the following detailed description, the appended claims, and the accompanying drawings.

BRIEF DESCRIPTION OF THE DRAWINGS

FIG. 5D illustrates a top isometric view of a boom according to embodiments.

FIG. 5E illustrates an underside isometric view of a boom according to embodiments.

DETAILED DESCRIPTION

Electronic device manufacturing may require very precise and rapid transport of substrates between various locations. In particular, in some embodiments, multi-arm robot apparatus including dual end effectors may be attached to one or more sides of the robot apparatus and may be adapted to transport substrates resting upon the end effectors to and from twin chambers of an electronic device processing system. Such systems may include multiple-arm robots arranged in an over/under configuration such that pick and place operations may take place at a chamber. Given the relatively high mass of so many moving robot arms and end effectors, requirements for rigidity and assembly of the robot mechanism may become a concern.

Accordingly, in one or more embodiments, a robot apparatus which may be used for transporting substrates to and from chambers (e.g., twin chambers) in electronic device manufacturing may be provided.

According to one or more embodiments of the invention, a boom drive apparatus is provided. The boom drive apparatus operates to drive one or more multi-arm robots attached at an outboard end of a boom, while providing suitable rigidity and ease of assembly. The boom drive apparatus includes a boom including a hub, a web extending from the hub, a first driving member rotationally mounted above the web, a second driving member rotationally mounted below the web, a first driven member rotationally mounted at an outboard end above the web, a second driven member rotationally mounted at the outboard end below the web, and transmission members coupling the respective driving members to the driven members above and below the web.

According to one or more embodiments of the invention, robot apparatus and electronic device processing systems including the robot boom drive apparatus are provided.

According to one or more additional embodiments of the invention, methods of transferring substrates with an electronic device processing system including the boom drive apparatus are provided.

Further details of example embodiments of the invention are described with reference to FIGS. 1-6.

Figure 1:
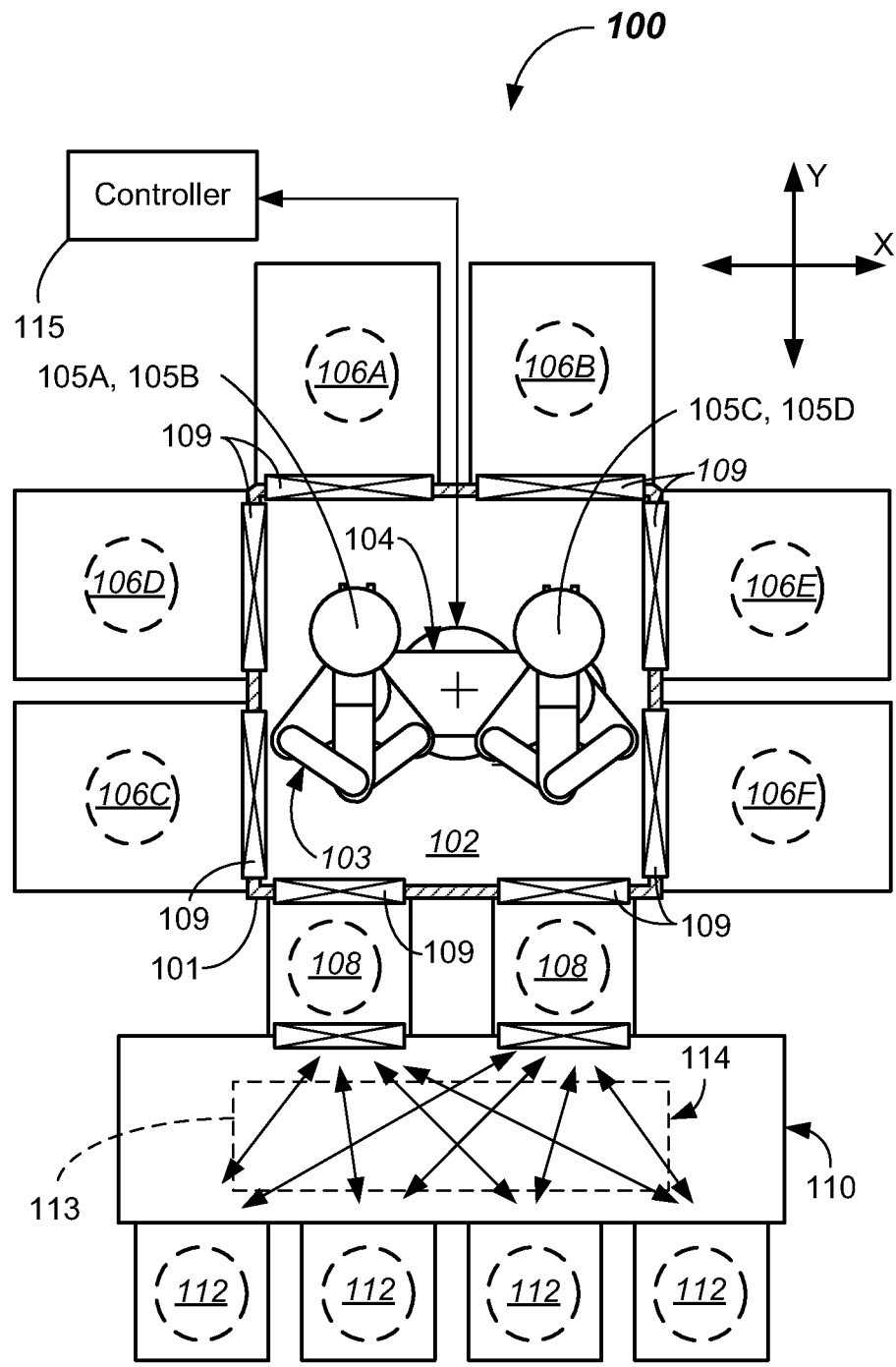
FIG. 1 illustrates a schematic top view of an electronic device processing system including a multi-arm robot apparatus with a boom drive apparatus according to embodiments.

FIG. 1 is a schematic block diagram of an example embodiment of an electronic device processing system 100 according to embodiments of the present invention. The electronic device processing system 100 may include a housing 101 having walls defining a transfer chamber 102. A multi-arm robot apparatus 103 in accordance with another embodiment of the invention may be at least partially housed within the transfer chamber 102. In particular, the moveable arms may be housed in the transfer chamber 102, while the drive motors may reside outside of the transfer chamber 102. The multi-arm robot apparatus 103 may be adapted to place or extract substrates 105A, 105B and 105C, 105D to and from destinations via operation of a boom drive apparatus 104, which is described fully below herein. The destinations may be twin chambers (e.g., twin chambers 106A, 106B; twin chambers 106C, 106D; and/or twin chambers 106E, 106F) that are coupled to and accessible from the transfer chamber 102. Twin chambers reside side-by-side and have facets that are generally parallel. Optionally, the destinations may be side-by-side load lock chambers 108, which may be coupled to the transfer chamber 102.

Process chambers 106A-106F may be adapted to carry out any number of process steps, such as deposition, oxidation, nitration, etching, polishing, cleaning, lithography, or the like. Other processes may be carried out therein. The load lock chambers 108 may be adapted to interface with and receive substrates from or provide substrates to a factory interface 110. The load lock chambers 108 may receive one or more substrates from substrate carriers 112 docked at load ports of the factory interface 110. Substrates may be transferred by a robot 113 (shown dotted) in the factory interface 110 and the transfer may take place in any sequence or direction as indicated by arrows 114. Substrates as used herein shall mean articles used to make electronic devices or circuit components, such as silicon-containing wafers, thinned wafers, silicon wafer subassemblies, silicon wafer packages and assemblies such as through silicon via (TSV) and wafer level packaging (WLP), sapphire wafers and/or wafer carriers, glass plates, glass masks, glass panels, or the like. The robot 103 may be used to transfer substrate carriers, as well.

In some embodiments, the transfer chamber 102 may be operated under a vacuum, for example. Each of the process chambers 106A-106F and load lock chambers 108 may include slit valves 109 at their ingress/egress, which may be adapted to open and close when placing or extracting substrates 105A-105D to and from process chambers 106A-106F and load lock chambers 108. Slit valves 109 may be of any suitable conventional construction. The motion of the various components of the multi-arm robot apparatus 104 may be controlled by suitable commands to the robot apparatus 104 from a controller 115 as will be apparent from the following.

Figure 2:
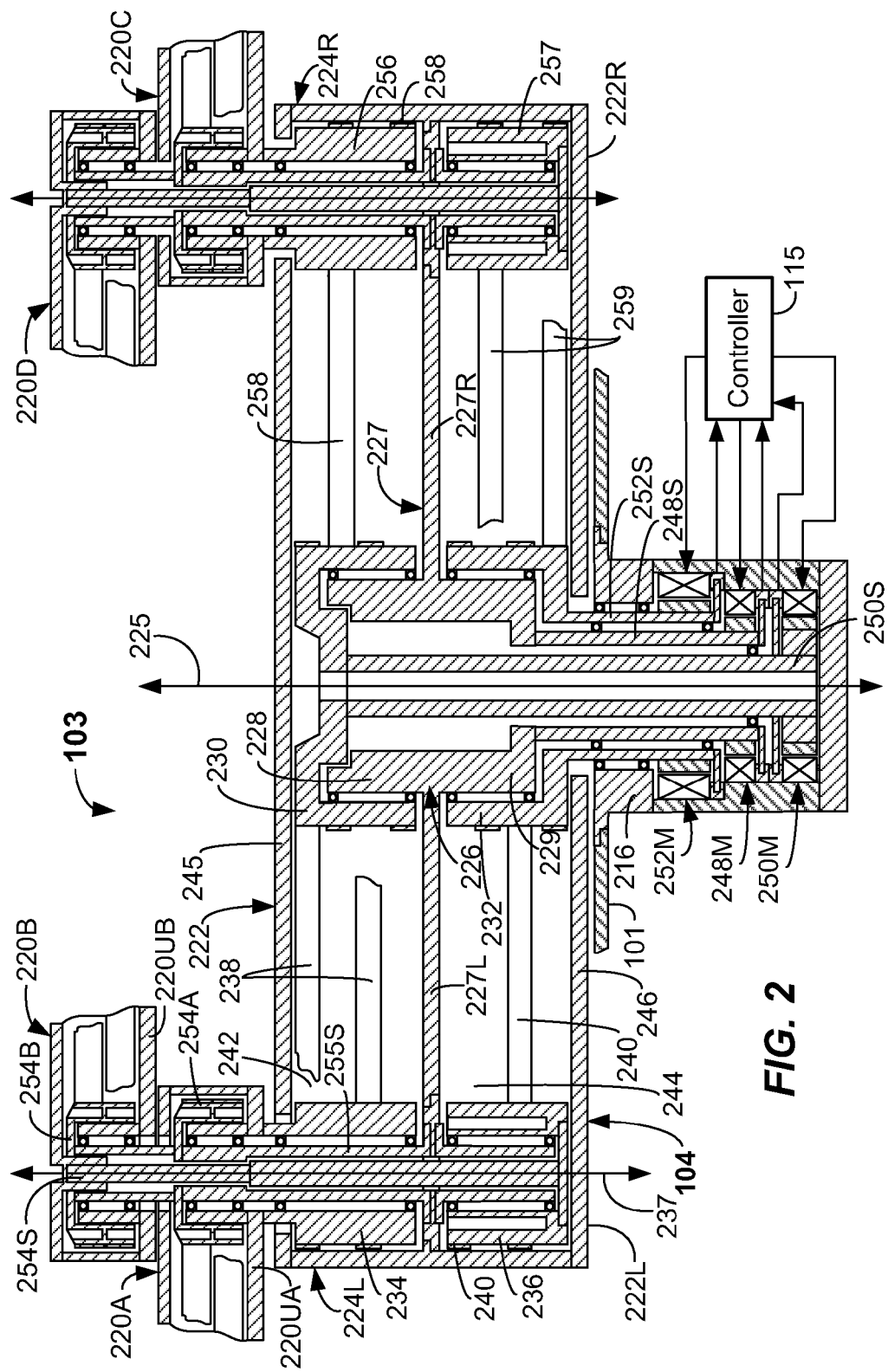
FIG. 2 illustrates a partial cross-sectioned side view of a multi-arm robot apparatus including a boom drive apparatus according to embodiments.
Figure 3A:
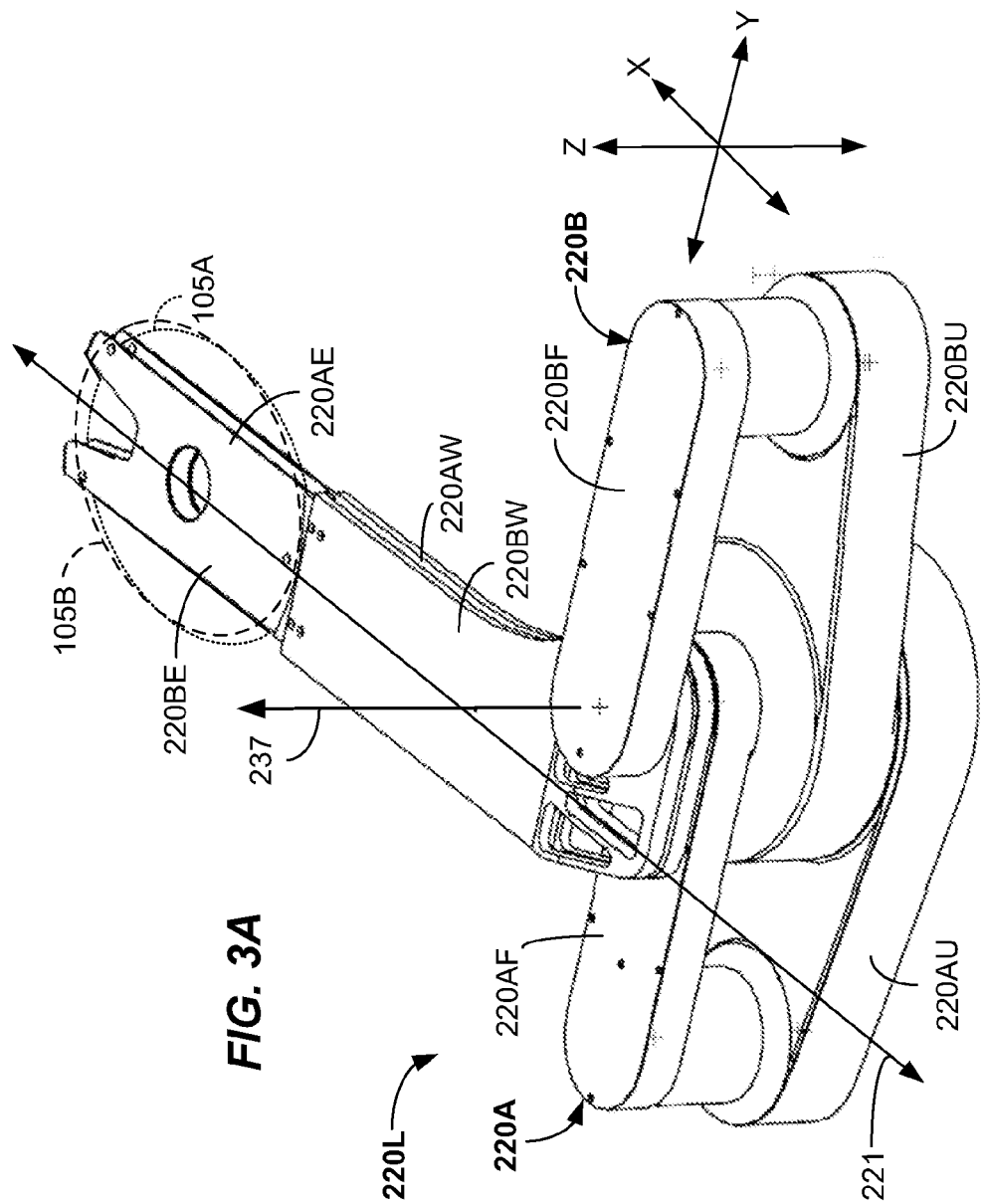
FIG. 3A illustrates an isometric view of a dual multi-arm robot apparatus adapted to be mounted and driven by a boom drive apparatus according to embodiments.
Figure 3B:
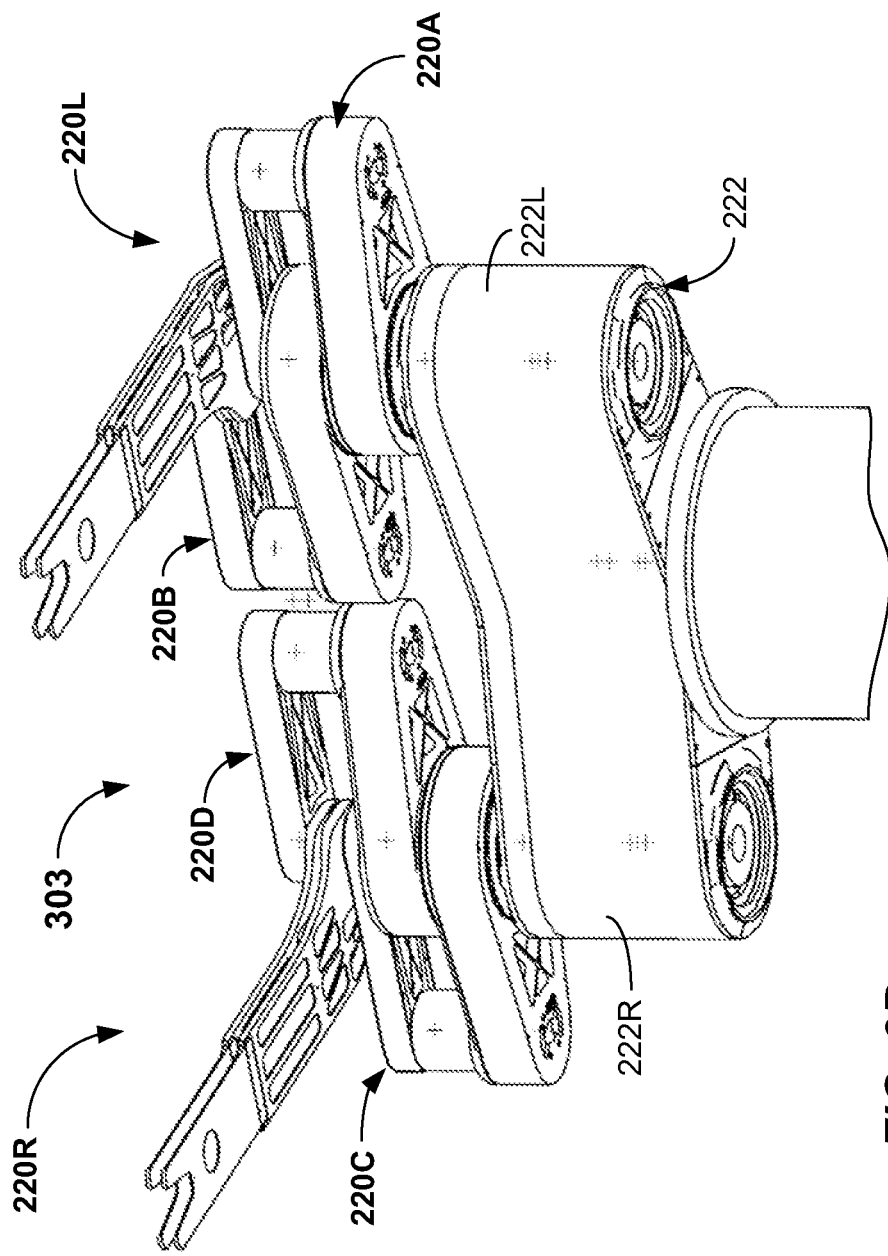
FIG. 3B illustrates an isometric underside view of a multi-arm robot apparatus including a boom drive apparatus according to embodiments.
Figure 4:
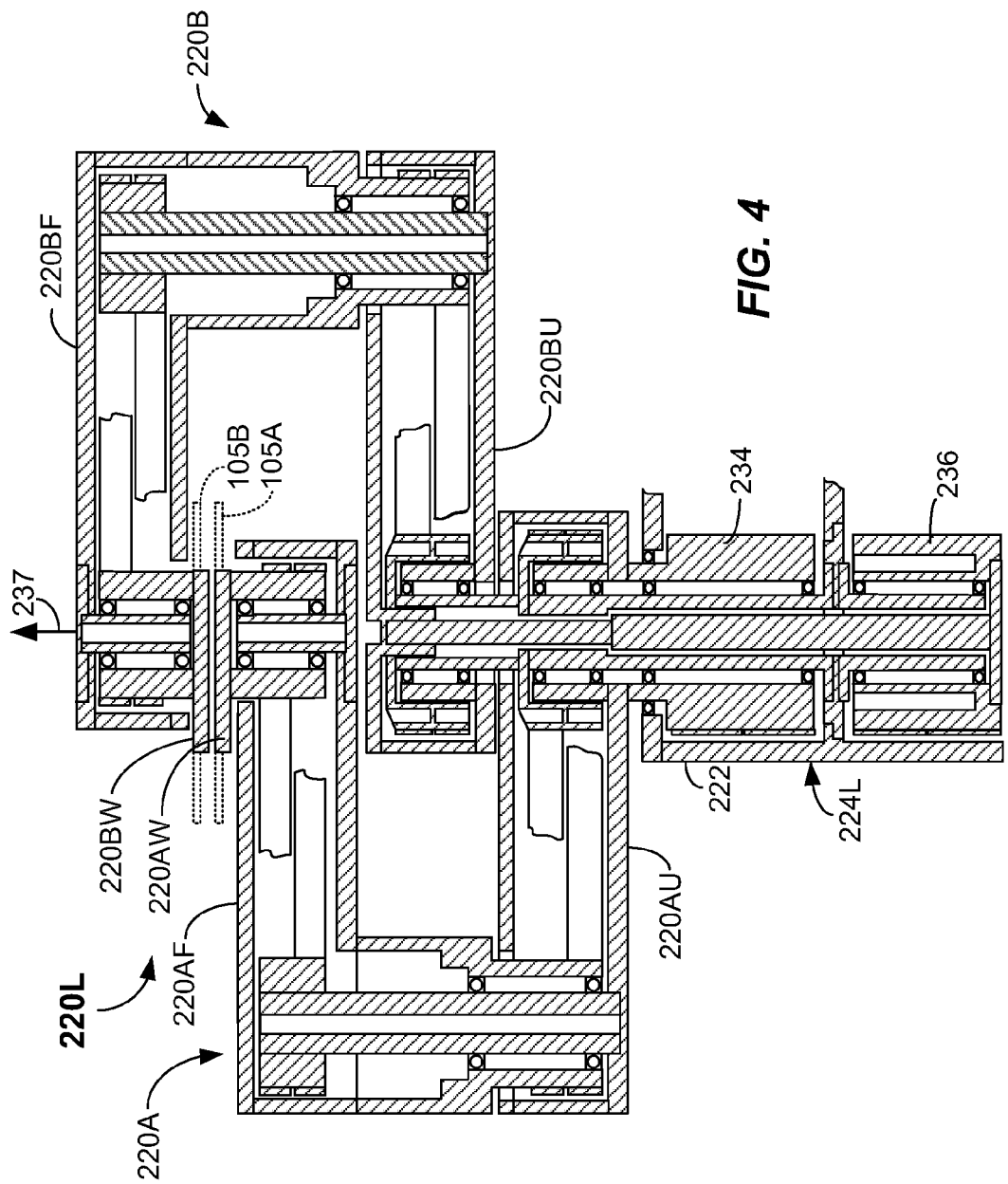
FIG. 4 illustrates a cross-sectioned side view of a configuration of a multi-arm robot according to embodiments.

Now referring to FIG. 2, a partial, cross-sectioned view of a multi-arm robot apparatus 103 having a boom drive apparatus 104 is shown. The multi-arm robot apparatus 103 may include a base 216 that may be adapted to be attached to a wall (e.g., a floor) of the housing 101. Accordingly, the robot apparatus 103 may be at least partially supported by the housing 101. The robot apparatus 103 also includes a boom drive apparatus 104 that is configured, operable and therefore adapted to drive one or more multi-link robots (e.g., multi-link robots 220A, 220B, 220C, 220D) that are coupled to a boom 222 (only a portion of the multilink robots 220A, 220B, 220C, 220D are shown). The multi-link robots 220A, 220B, 220C, 220D may be Selective Compliance Articulated Robot Assembly (SCARA) robots. A representative view of a configuration of the multi-link robots 220C, 220D is shown in FIGS. 3A and 4. The SCARA robots 220C, 220D are identical in the depicted embodiment to those shown in FIG. 3A, except that the various arms are reversed (mirrored) in orientation from that shown in FIGS. 3A and 4. Other types of multi-link robots may be driven by the boom drive apparatus 104. In the depicted embodiment of FIG. 2, the boom drive apparatus 104 includes the boom 222 having first and second boom portions 222L, 222R, which may extend radially outward from a primary rotational axis 225 of the boom 222 in generally opposite directions.

In the depicted embodiment, twin multi-link robots 220A, 220B are mounted to a first outboard end 224L of the first boom portion 222L of the boom 222. Likewise, twin multi-link robots 220C, 220D may be mounted to a second outboard end 224R of the second boom portion 222R of the boom 222. However, it should be recognized that the boom drive apparatus 104 and robot apparatus 103 may be configured with only one boom portion (e.g., 222L) and only one set of twin multi-link robots, such as twin multi-link robots 220A, 220B (e.g., SCARA robots) only.

In another option, only a single multi-arm robot may be provided on either outboard end 224L, 224R, and may be driven by the boom drive apparatus 104, but each multi-arm robot may have additional functionality, such as independent control of and upper arm and forearm, or independent control of an upper arm and wrist member, for example. In yet another option, only a single outboard end 224L may be provided on the boom 222, and only a single multi-arm robot may be coupled to an outboard end 224L, but the single multi-arm robot may be used to independently control more than one arm of the multi-arm robot.

Now describing the FIG. 2 embodiment in more detail, the boom 222 includes a hub 226 generally centrally located proximate to the primary rotational axis 225, and a web 227 extending (e.g., radially) from the hub 226. The web 227 may be approximately centrally located in a vertical extent in the boom 222. The hub 226 may include the first web portion 227L extending to the first outboard end 224L and the second web portion 227R extending to the second outboard end 224R. The first web portion 227L and second web portion 227R may extend radially from the hub 226 in generally opposite directions. The boom portions 222L, 222R may be slightly offset as shown in FIGS. 3B-3E, so as to provide a boomerang shape, for example, wherein an axis extending between the primary axis 225 and the attachment locations of the multi-arm robot apparatus 220A, 220B on the outboard ends 224L is non-parallel with an axis extending between the primary axis 225 and the attachment locations of the multi-arm robot apparatus 220C, 220D on the outboard ends 224R.

The hub 226 may include a first pilot 228 extending in a first direction above the web 227, and a second pilot 229 extending in a second direction below the web 227. The pilots 228, 229 may comprise cylindrical portions extending above and below the web 227. The boom drive apparatus 104 includes a first driving member 230, such as a pulley, rotationally mounted to the first pilot 228 above the web 227, and a second driving member 232, such as a pulley, rotationally mounted to the second pilot 229 below the web 227. Above and below refer to the orientation shown in FIG. 2. However, it should be understood that the robot 103 may be inverted, thus the first driving member 230 is on a first side of the web 227 and the second driving member 232 is on an opposite side of the web 227.

The rotational mounting of the first driving member 230 and the second driving member 232 to the respective first and second pilots 228, 229 may be by one or more suitable bearing members (e.g., ball bearings or the like). The boom drive apparatus 104 also includes a first driven member 234 rotationally mounted to the boom 222 above the web 227 at an outboard location near the outboard end 224L, and a second driven member 236 rotationally mounted to the boom 222 below the web 227 at an outboard location near the outboard end 224L. Again, above and below are relative terms based upon the depicted orientation. In short, the first driven member 234 and the second driven member 236 are provided on opposite sides of the web 237. The first driven member 234 and the second driven member 236 may be rotationally mounted and rotate about a first outboard axis 237. The boom drive apparatus 104 also includes a first transmission member 238 coupling the first driving member 230 to the first driven member 234 above the web 227, and a second transmission member 240 coupling the second driving member 232 to the second driven member 236 below the web 227. The first transmission member 238 may comprise multiple belts (e.g., metal belts) that are pinned to the respective first driving member 230 to the first driven member 234. Likewise, the second transmission member 240 may comprise multiple belts (e.g., metal belts) that are pinned to the respective second driving member 232 to the second driven member 236.

Figure 5A:
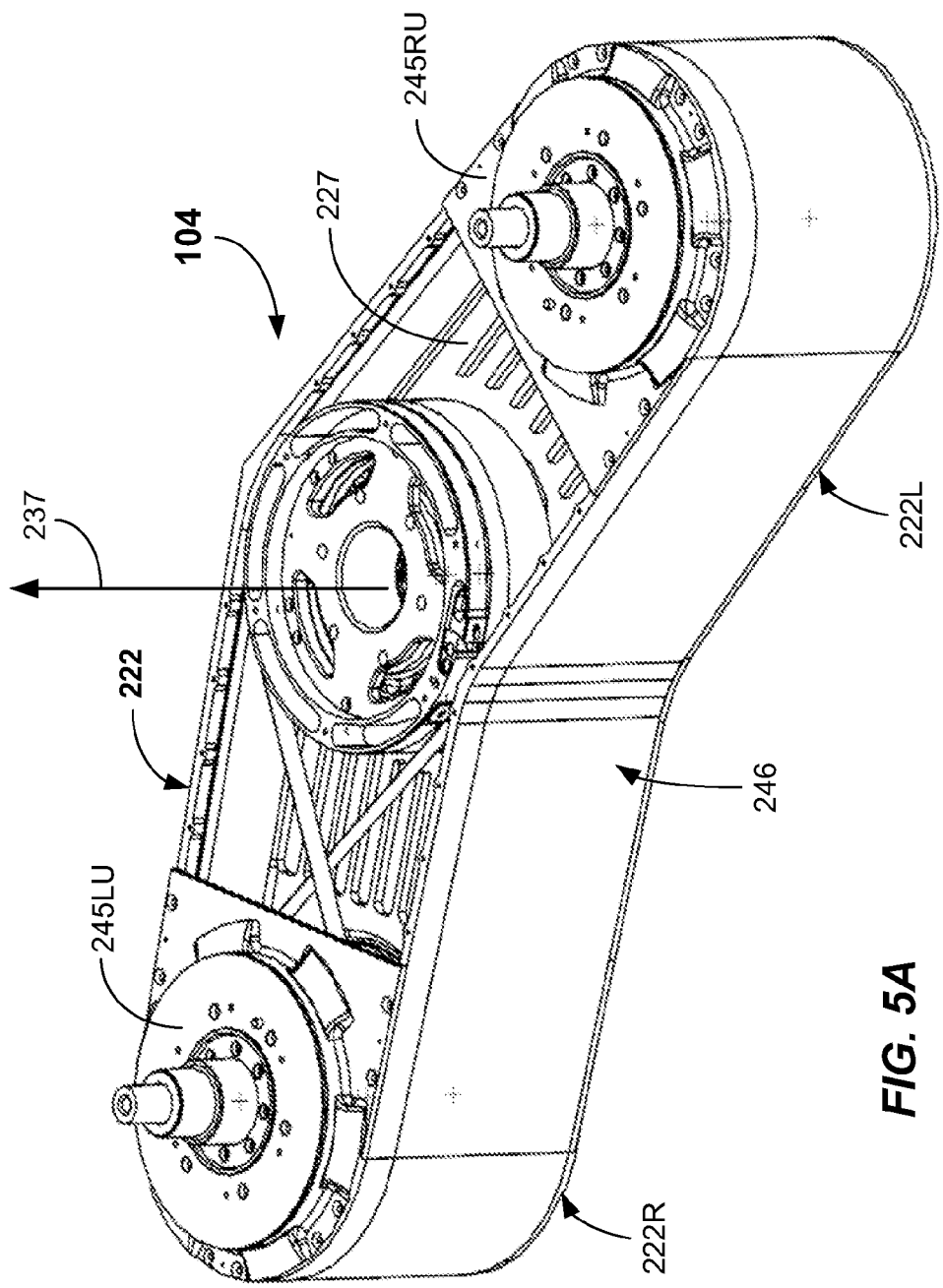
FIG. 5A illustrates a top isometric view of a boom drive apparatus with a center portion of a top cover removed according to embodiments.
Figure 5B:
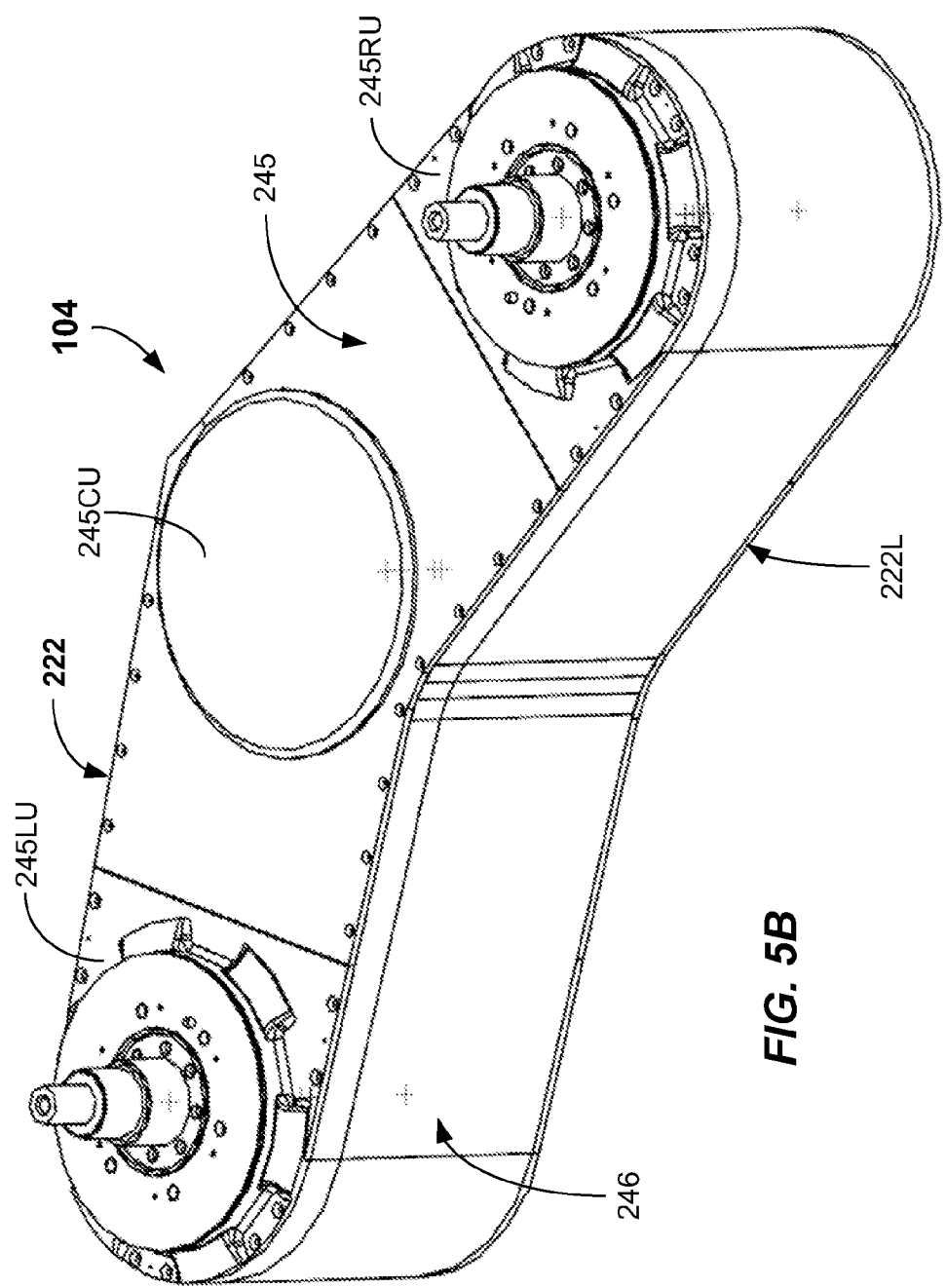
FIG. 5B illustrates a top isometric view of a boom drive apparatus according to embodiments.

In more detail, the boom 222 may comprise upper walls 242 extending above the web 227 and lower walls 244 extending below the web 227. The upper walls 242 may be integral with the web 227 or separate therefrom and coupled to the web 227, such as by fasteners. The upper walls 242 may surround sides of the first driving member 230, first driven member 234, and first transmission member 238. An upper cover 245 may couple to the upper walls 242 and cover the tops of the first driving member 230, first driven member 234, and first transmission member 238. Likewise, a lower cover 246 may couple to the lower walls 244 and cover the exposed bottom sides of the second driving member 232, second driven member 236, and second transmission member 240. Coupling of the covers 245, 246 to the walls 242, 244 may be by any mechanical fasteners, such as screws or bolts. The covers 245, 246 may comprise multiple pieces in some embodiments, as is shown in FIGS. 5A and 5B, for example.

The boom drive apparatus 104 may also include a third driven member 256 rotationally mounted to the boom 222 above the web 227 at an outboard end thereof (e.g., at end 224R), and a fourth driven member 257 rotationally mounted to the boom 222 below the web 227 at the outboard end (e.g., 224R). A third transmission member 258 couples the first driving member 230 to the third driven member 256 above the web 227, and a second transmission member 259 couples the second driving member 232 to the fourth driven member 257 below the web 227.

The boom 222 may be adapted to be rotated about the primary rotational axis 225 in either a clockwise or counterclockwise rotational direction. The rotation may be provided by any suitable boom drive motor 248M, such as a conventional variable reluctance or permanent magnet electric motor. Other types of motors may be used. The boom drive motor 248M may drive a boom pilot shaft 248S extending from the hub 226 and coupled to the boom drive motor 248M. The rotation of the boom 222 may be controlled by suitable commands to the boom drive motor 248M from the controller 115. Controlled rotation of the boom 222 may be +/−360 degrees or more. Position feedback may be provided from any suitable feedback sensor, such that an orientation of the boom 222 may be precisely known at all times.

The upper arm 220UA of the first multi-arm robot 220A may be adapted to be rotated about first outboard axis 237 in either a clockwise or counterclockwise rotational direction. The rotation may be less than about 180 degrees, for example, or even less than 170 degrees in some embodiments. The upper arm 220UA may be driven by rotation of a first drive motor 250M. The boom drive apparatus 104 includes a first driving member pilot shaft 250S extending to the first driving member 230. The first driving member pilot shaft 250S is adapted to be driven by the first drive motor 250M. Driving first driving member pilot shaft 250S rotates the first driving member 230 above the web 227, and resultantly rotates first driven member 234, which may be a pulley which is coupled to and rotates the upper arm 220UA of the first multi-arm robot 220A.

Similarly, the upper arm 220UB of the second multi-link robot 220B may be adapted to be rotated about first outboard axis 237 in either a clockwise or counterclockwise rotational direction. The rotation may be less than about 180 degrees, for example, or even less than 170 degrees in some embodiments. The upper arm 220UB may be driven by rotation of a second drive motor 252M. The boom drive apparatus 104 includes a second driving member pilot shaft 252S extending to the second driving member 232 below the web 227. The second driving member pilot shaft 252S is adapted to be driven by the second drive motor 252M. Driving the second driving member pilot shaft 252S rotates the second driving member 232 below the web 227, which rotates the second upper arm 220UB of the first multi-arm robot 220B that is coupled thereto.

As shown in FIG. 2, rotation of the second driven member 236, which may be a pulley, rotates an inner shaft 254S, which couples to the upper arm 220UB of the second multi-arm robot 220B, such as at a top thereof. An outer shaft 255S may be received over the inner shaft 254S and may be adapted to couple to both the first and second forearm driving pulleys 254A, 254B. The first and second forearm driving pulleys 254A, 254B are coupled to transmission members that may be used to drive the respective forearms 220AF, 220BF of the multi-arm robots 220A, 220B. The first forearm driving pulley 254A and the second forearm driving pulley 254B may be non-rotationally coupled to the web 227 at the first outboard end 224L. The coupling may be provided by the outer shaft 255S interconnecting the first forearm driving pulley 254A and the second forearm driving pulley 254B with the web 227.

In the depicted embodiments, the first and second multi-link robots 220A, 220B may be three-link SCARA (selective compliance assembly robot arm) robots, for example. In operation, once the boom 222 is positioned adjacent to the desired destination for a put or pick of substrates, the robot apparatus 103 may be actuated to put or pick substrates 105A-105D to or from the destination.

In more detail, a multi-arm robot assembly 220L including embodiments of the first and second multi-arm robots 220A, 220B are illustrated in FIG. 3A. Each multi-arm robot 220A, 220B may include an upper arm 220AU, 220BU, which may be adapted to be rotated in an X-Y plane relative to the boom 222 about the first outboard axis 237. Coupled to the upper arms 220AU, 220BU at respective outboard ends of the upper arms 220AU, 220BU may be forearms 220AF, 220BF. Furthermore, wrist members 220AW, 200BW may be coupled to respective outboard ends of each of the forearms 220AF, 220BF. The wrist members 220AW, 220BW may each include end effectors 220AE, 220BE, which is adapted to carry the substrates 105A, 105B (shown dotted) to be processed within the electronic device processing system 100. As shown, the end effectors 220AE, 220BE lie one over the other. Each of the end effectors 220AE, 220BE function to move parallel to the line of action 221. The end effectors 220AE, 220BE may be attached to the wrist members 220AW, 220BW as a separate member or may be formed as an integral unit with the wrist members 220AW, 220BW. A robot assembly 220R on the other end of the boom 222 may be a substantial mirror image of the robot assembly 220L.

Z axis capability may be provided to the multi-arm robot 103, or Z axis capability may be provided in the chambers 106A-106F (e.g., Z-axis moveable lift pins) to accomplish the pick and place operations of the substrates 105A-105D.

Figure 3C:
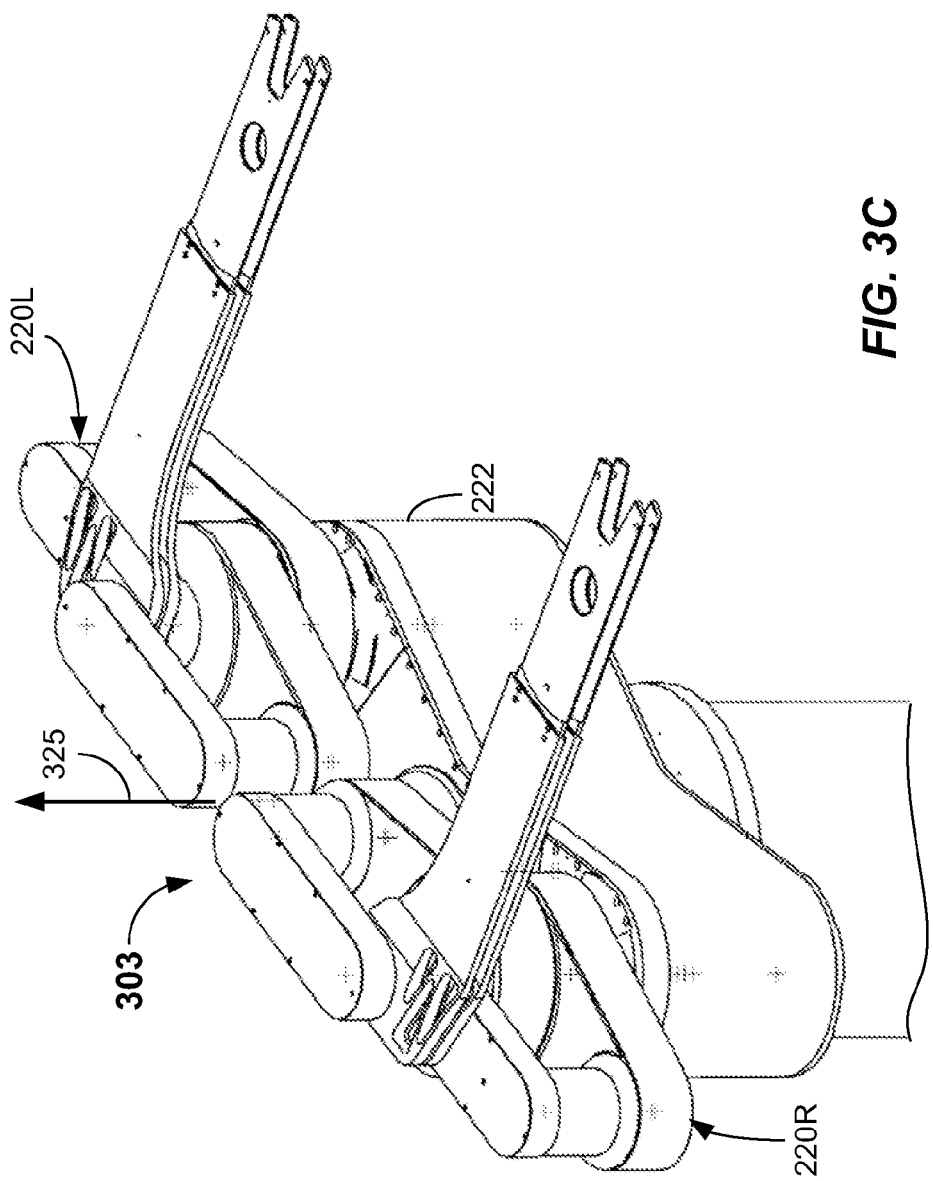
FIG. 3C illustrates a top isometric view of a multi-arm robot apparatus including a boom drive apparatus according to embodiments.

FIGS. 3B-3E illustrates another embodiment of a robot apparatus 303 that may be adapted for use within an electronic device processing system 100. The robot apparatus 303 in this embodiment may include a base 216 adapted to attach a housing 101, such as to a wall of a chamber (e.g., transfer chamber 102). The boom 222 which may be adapted for rotation about the primary rotational axis 325 (FIG. 3C). The robot apparatus 303 may further include multi-arm robots 220A, 220B and 220C, 220D mounted at outboard ends of the boom 222 as previously described.

In this embodiment, the robot apparatus 303 may include robot assembly 220L including, as shown in FIG. 3A, having upper arms 220AU, 220BU, forearms 220AF, 220BF, wrist members 220AW, 220BW, and the attached end effectors 220AE, 220BE.

Figure 3D:
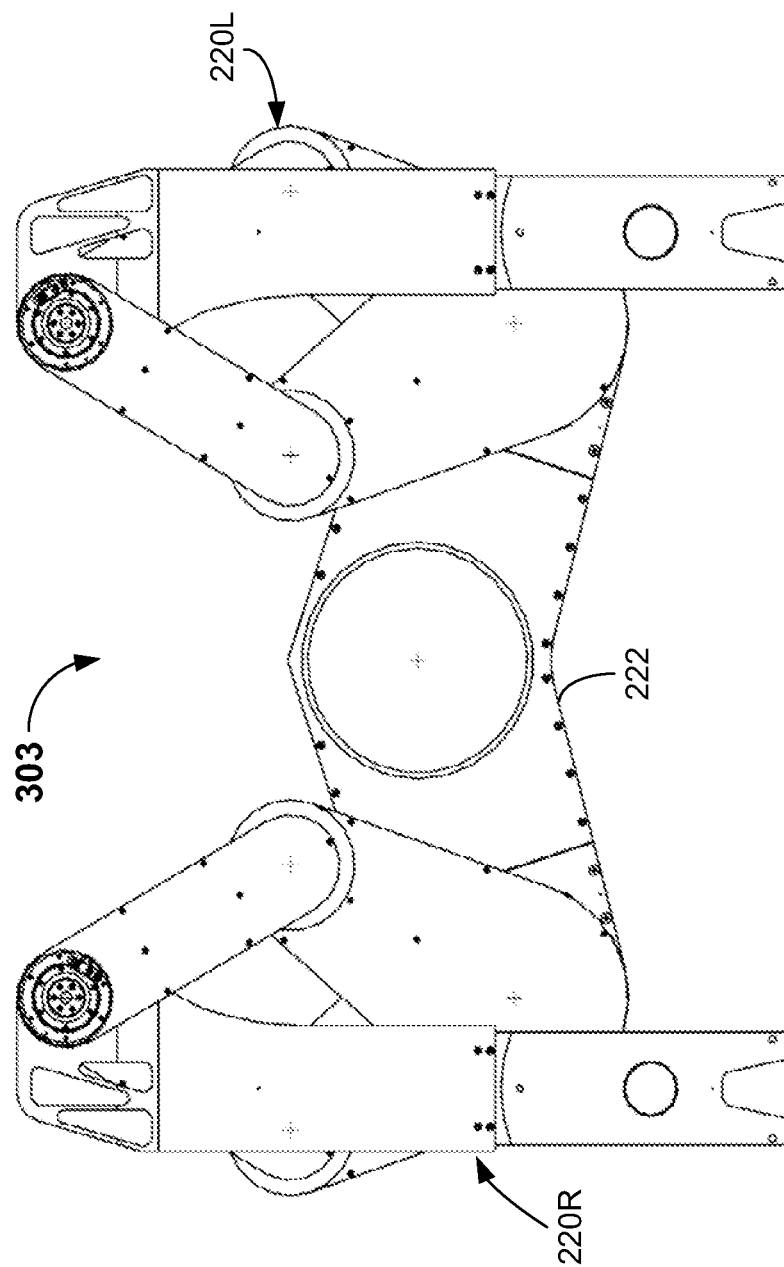
FIG. 3D illustrates a top plan view of a multi-arm robot apparatus including a boom drive apparatus shown in a home position according to embodiments.
Figure 3E:
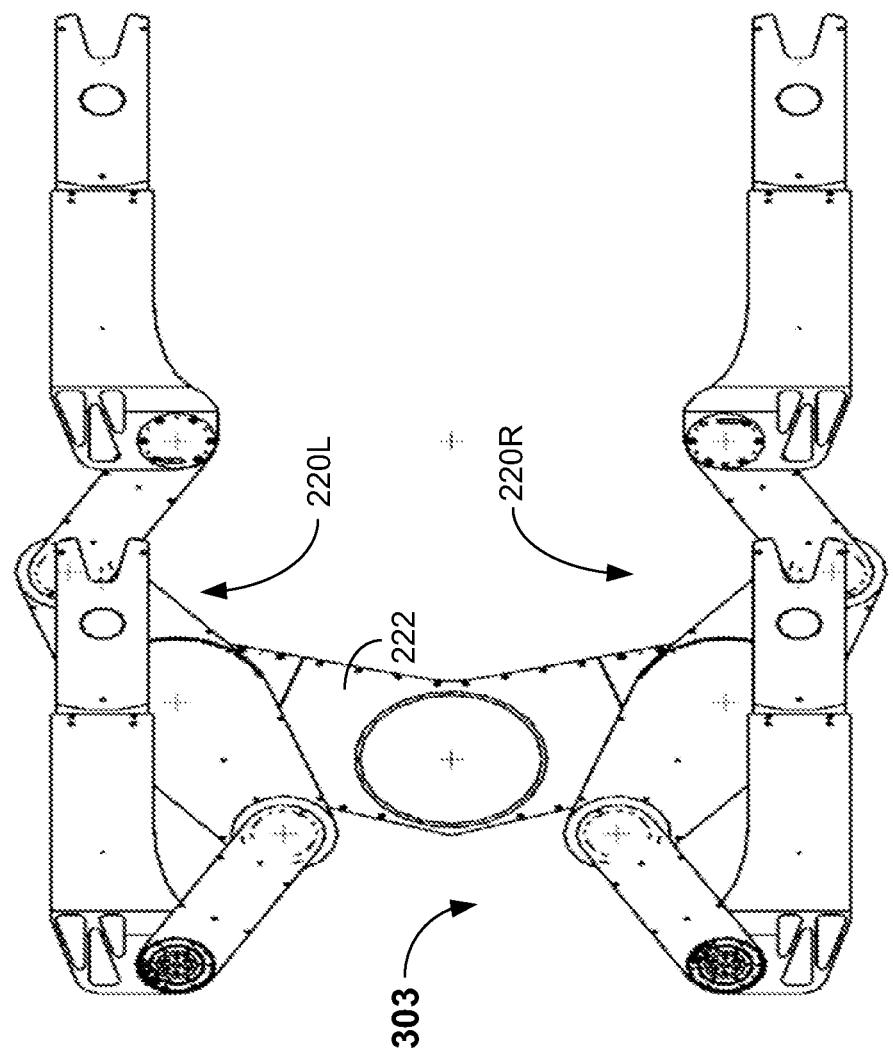
FIG. 3E illustrates a top plan view of a multi-arm robot apparatus including a boom drive apparatus shown in an extended position according to embodiments.

FIGS. 3C-3D illustrate several orientations achievable by the robot apparatus 303, including an orientation in FIG. 3C wherein the upper arms and forearms are generally aligned along a length of the boom 222; the orientation in FIG. 3D wherein the upper arms and forearms are shown retracted and in a "Home" orientation, that may be used when rotating the boom 222 to transfer to or from a new set of twin chambers 106A-106B, 106C-106D, or 106E-106F or load locks 108; and the orientation in FIG. 3E wherein some of the upper arms and forearms are shown retracted and some are shown extended, as would be the case when accessing a process chambers 106A-106B, 106C-106D, or 106E-106F or load lock 108 to pick and place substrates therein.

FIG. 4 illustrates a cross-sectional view of representative multi-link robots 220A, 220B. These multi-link robots 220A, 220B may operate to service a single chamber (e.g., 106A, 106C, 106E), for example. The robot apparatus 220A in this embodiment may be mounted on an outboard end 224L of the boom 222. Each multi-arm robot 220A, 220B is spaced a distance from the primary rotational axis 225 (FIG. 2).

In this embodiment, each multi-link robot 220A, 220B may include upper arms 220AU, 220BU adapted for rotation about the first outboard axis 237 in an X-Y plane. The upper arms 220AU, 220BU may include forearms 220AF, 220BF coupled to the upper arms 220AU, 220BU at their respective at their respective outboard ends. The forearms 220AF, 220BF may each include wrist members 220AW, 220BW rotationally attached thereto at their outboard ends. The wrist members 220AW, 220BW may be adapted for relative rotation about the wrist axes relative to the forearms 220AF, 220BF in an X-Y plane. The various pulley connections and lengths of the upper arms 220AU, 220BU and forearms 220AF, 220BF may be appropriately sized so that the wrist members 220AW, 220BW translate parallel to the line of action 221 (FIG. 3A). End effectors 220AE, 220BE may be included on the wrist members 220AW, 220BW. The end effectors 220AE, 220BE may be attached to the wrist members 220AW, 220BW as separate members as shown or may be formed as an integral unit with the wrist members 220AW, 220BW. The end effectors 220AE, 220BE may each be adapted to carry a substrate 105A, 105B. The multi-link robots 220A, 220B may be driven remotely by a driving the first and second driven members 234, 236.

FIGS. 5A-5E illustrate various views of the boom drive apparatus 104 that may be utilized to drive one or more multi-link robots (e.g., 220A, 220B, 220C, 220D) within an electronic device processing system 100, for example. The boom 222 may include boom portions 222L, 222R that may be multiple cantilever beams extending outwardly in generally opposite radial directions from the primary rotational axis 237. The body of the boom 222 may have an I-beam shape in cross section as best shown in FIGS. 5D and 5E. The web 227 may be generally centrally located along a vertical height of the boom 222. The boom 222 may have a boomerang shape that may allow the end effectors 220AE, 220BE to be moved very close to the chambers they service. With the dual multi-arm robots 220A, 220B and dual multi-arm robots 220C, 220D coupled to the boom drive apparatus 104, a complete substrate exchange may be made at a destination without any rotation of the boom 222 by extending and retracting the end effectors 220AE, 220BE (See FIGS. 3A and 3E).

As shown in FIG. 5A-5B, the boom 222 may include an upper cover 245 having left, right, and central upper cover portions, 245LU, 245RU, and 245CU. A lower cover 246 may be provided on the lower portion of the boom 222.

Figure 5C:
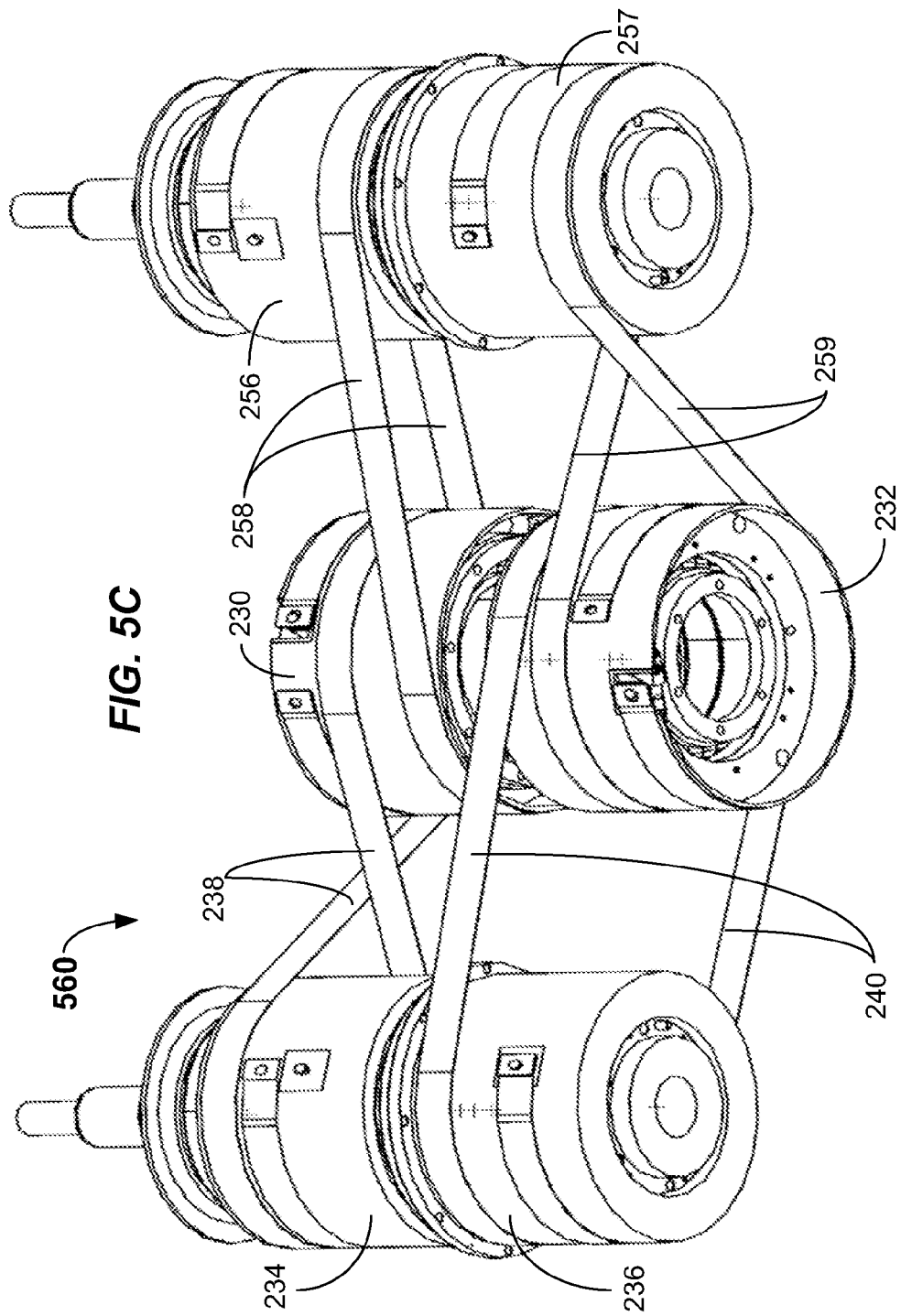
FIG. 5C illustrates an underside isometric view of the drive components of a boom drive apparatus shown removed from the boom according to embodiments.

FIG. 5C illustrates an isometric view of a boom drive assembly 560 showing the various drive components of the boom drive apparatus 104 with the boom 222 being removed for clarity. The boom drive assembly 560 may include the first driving member 230, and the second driving member 232 positioned one above the other and adapted to be rotationally mounted to the boom 222 above and below the web 227. The boom drive assembly 560 also includes the first driven member 234, and the second driven member 236 positioned one above the other and adapted to be rotationally mounted to the boom 222 below the web 227. The boom drive assembly 560 also includes the first transmission member 238 coupling the first driving member 230 to the first driven member 234, and a second transmission member 240 coupling the second driving member 232 to the second driven member 236. As can be seen in FIG. 5C, each belt of the first transmission member 238 is wound in an S-shaped orientation, whereas each belt in the second transmission member 240 is wound in a C-shaped orientation. Likewise, the boom drive assembly 560 also includes the third transmission member 258 coupling the first driving member 230 to the third driven member 256, and a fourth transmission member 259 coupling the second driving member 232 to a fourth driven member 257. As can be seen in FIG. 5C, each belt of the third transmission member 258 is wound in wound in a C-shaped orientation, whereas each belt in the fourth transmission member 259 is wound an S-shaped orientation. Thus, each of the first and second driven members includes connected transmission members that are some wound in an S-shaped orientation, and some wound in a C-shaped orientation.

Figure 6:
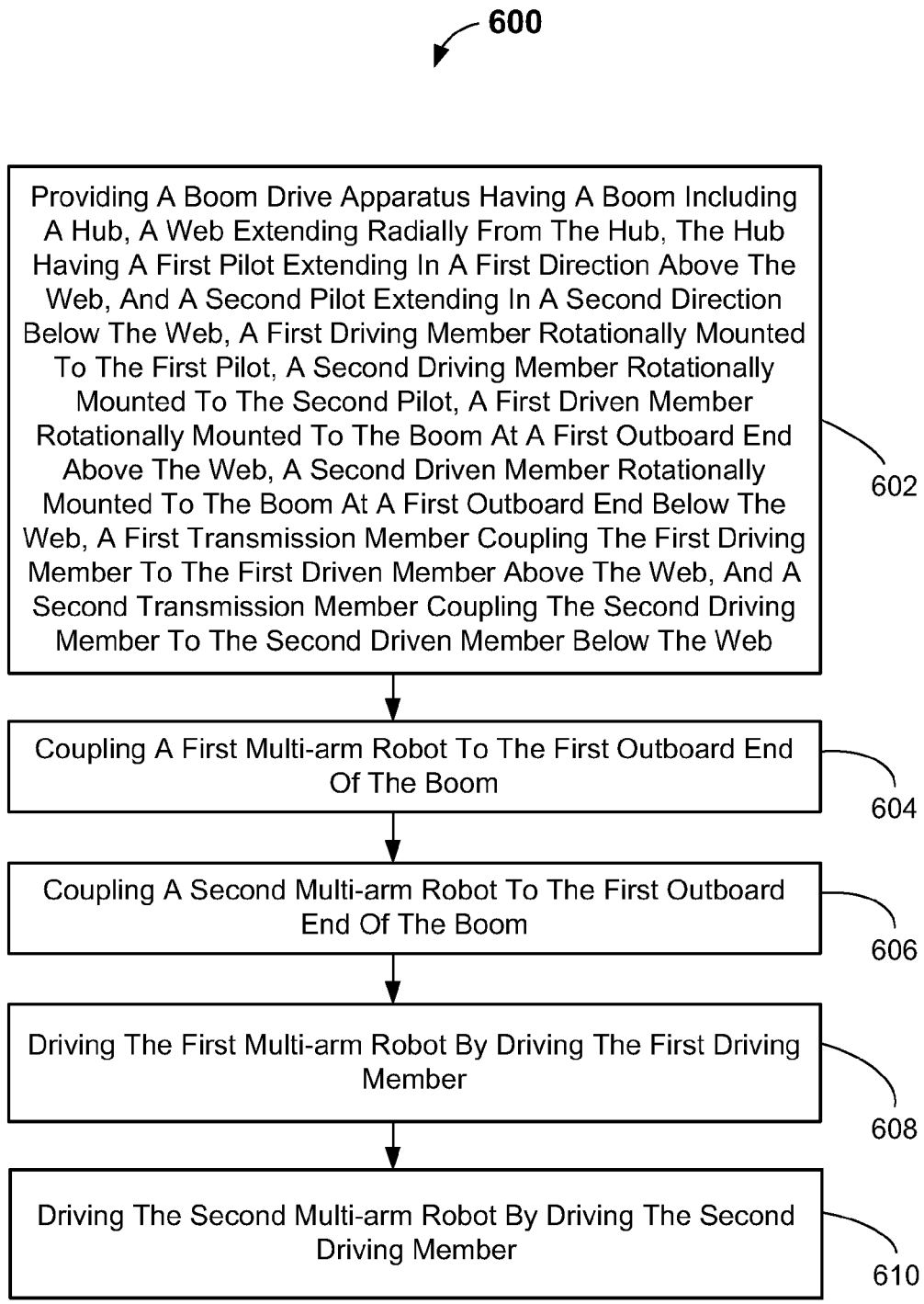
FIG. 6 is a flowchart depicting a method of transporting substrates within an electronic device processing system according to embodiments.

A method 600 of transporting a substrate within an electronic device processing system according to embodiments of the present invention is provided in FIG. 6. The method 600 includes providing in 602, a boom drive apparatus (e.g., 104) having a boom (e.g., 222) including a hub (e.g., 226), a web (e.g., 222) extending radially from the hub, the hub having a first pilot (e.g., 228) extending in a first direction above the web, and a second pilot (e.g., 229) extending in a second direction below the web, a first driving member (e.g., 230) rotationally mounted to the first pilot, a second driving member (e.g., 232) rotationally mounted to the second pilot, a first driven member (e.g., 234) rotationally mounted to the boom at a first outboard end (e.g., 224L) above the web, a second driven member (e.g., 236) rotationally mounted to the boom at the first outboard end below the web, a first transmission member (e.g., 238) coupling the first driving member to the first driven member above the web, and a second transmission member (e.g., 240) coupling the second driving member to the second driven member below the web. The method 600 also includes, in 604, coupling a first multi-arm robot (e.g., 220A) to the first outboard end (e.g., 224L) of the boom (e.g., 222), in 606, coupling a second multi-arm robot (e.g., 220B) to the first outboard end (e.g., 224R) of the boom (e.g., 222), in 608, driving the first multi-arm robot (e.g., 220A) by driving the first driving member (e.g., 230), and, in 610, driving the second multi-arm robot (e.g., 220B) by driving the second driving member (e.g., 232).

The foregoing description discloses only example embodiments of the invention. Modifications of the above-disclosed apparatus and methods which fall within the scope of the invention will be readily apparent to those of ordinary skill in the art. Accordingly, while the present invention has been disclosed in connection with example embodiments thereof, it should be understood that other embodiments may fall within the scope of the invention, as defined by the following claims.

The invention claimed is:

1. A boom drive apparatus, comprising:
a boom including a hub, a web extending from the hub, the hub having a first pilot extending in a first direction above the web, and a second pilot extending in a second direction below the web, upper walls extending above the web and lower walls extending below the web, an upper cover coupled to the upper walls, and a lower cover coupled to the lower walls;
a first driving member rotationally mounted to the first pilot;
a second driving member rotationally mounted to the second pilot;
a first driven member rotationally mounted to the boom above the web at a first outboard location;
a second driven member rotationally mounted to the boom below the web at a second outboard location;
a first transmission member coupling the first driving member to the first driven member above the web; and
a second transmission member coupling the second driving member to the second driven member below the web.

2. The boom drive apparatus of claim 1, comprising first and second forearm driving pulleys non-rotationally coupled to the web at a first outboard end.

3. The boom drive apparatus of claim 1, comprising an inner shaft coupling the second driven member to the second upper arm, and an outer shaft received over the inner shaft and coupling to a first forearm driving pulley and a second forearm driving pulley.

4. The boom drive apparatus of claim 1, comprising a boom pilot shaft extending from the hub and adapted to be driven by a boom drive motor.

5. The boom drive apparatus of claim 1, comprising a first driving member pilot shaft extending from the first driving member and adapted to be driven by a first drive motor.

6. The boom drive apparatus of claim 1, comprising a second driving member pilot shaft extending from the second driving member and adapted to be driven by a second drive motor.

7. The boom drive apparatus of claim 1, wherein the web is approximately vertically centrally located in the boom.

8. An electronic device processing system, comprising:
a transfer chamber;
a robot apparatus received in the transfer chamber and adapted to transport multiple substrates, the robot apparatus having a boom drive apparatus having
a boom adapted to be rotated about a primary rotational axis, the boom including a hub, a web extending radially from the hub, the hub having a first pilot extending in a first direction above the web, and a second pilot extending in a second direction below the web,
a first driving member rotationally mounted to the first pilot,
a second driving member rotationally mounted to the second pilot,
a first driven member rotationally mounted to the boom at an outboard end above the web,
a second driven member rotationally mounted to the boom at an outboard end below the web,
a first transmission member coupling the first driving member to the first driven member above the web, and
a second transmission member coupling the second driving member to the second driven member below the web;
a first multi-arm robot rotationally coupled to the boom at the first outboard end, the first multi-arm robot having a first upper arm coupled to the first driven member, a first forearm, a first wrist member, and a first end effector adapted to support a first substrate; and
a second multi-arm robot rotationally coupled to the boom at the first outboard end, the second multi-arm robot having a second upper arm coupled to the second driven member, a second forearm, a second wrist member, and a second end effector adapted to support a second substrate.

9. A method of transporting substrates within an electronic device processing system, comprising:
providing a boom drive apparatus having a boom including a hub, a web extending radially from the hub, the hub having a first pilot extending in a first direction above the web, and a second pilot extending in a second direction below the web, a first driving member rotationally mounted to the first pilot, a second driving member rotationally mounted to the second pilot, a first driven member rotationally mounted to the boom at a first outboard end above the web, a second driven member rotationally mounted to the boom at a first outboard end below the web, a first transmission member coupling the first driving member to the first driven member above the web, and a second transmission member coupling the second driving member to the second driven member below the web;
coupling a first multi-arm robot to the first outboard end of the boom;
coupling a second multi-arm robot to the first outboard end of the boom;
driving the first multi-arm robot by driving the first driving member; and
driving the second multi-arm robot by driving the second driving member.

10. A multi-arm robot apparatus, comprising:
a boom drive apparatus having
a boom adapted to be rotated about a primary rotational axis, the boom including a hub, a web extending radially from the hub, the hub having a first pilot extending in a first direction above the web, and a second pilot extending in a second direction below the web,
a first driving member rotationally mounted to the first pilot,
a second driving member rotationally mounted to the second pilot,
a first driven member rotationally mounted to the boom at a first outboard end above the web,
a second driven member rotationally mounted to the boom at the first outboard end below the web,
a first transmission member coupling the first driving member to the first driven member above the web, and
a second transmission member coupling the second driving member to the second driven member below the web;
a first multi-arm robot rotationally coupled to the boom at the first outboard end, the first multi-arm robot having a first upper arm coupled to the first driven member, a first forearm, a first wrist member, and a first end effector adapted to support a first substrate; and
a second multi-arm robot rotationally coupled to the boom at the first outboard end, the second multi-arm robot having a second upper arm coupled to the second driven member, a second forearm, a second wrist member, and a second end effector adapted to support a second substrate.

11. The robot apparatus of claim 10, wherein the first and second first multi-arm robots comprise SCARA robots.

12. The robot apparatus of claim 10, comprising third and fourth multi-arm robots coupled to the boom at a second outboard end.

13. The robot apparatus of claim 12, wherein the third and fourth multi-arm robots comprise SCARA robots.

14. The robot apparatus of claim 10, comprising a boom pilot shaft extending to the hub and coupled to a boom drive motor.

15. The robot apparatus of claim 10, comprising a first driving member pilot shaft extending to the first driving member and coupled to a first drive motor.

16. The robot apparatus of claim 10, comprising a second driving member pilot shaft extending to the second driving member and coupled to a second drive motor.

17. The robot apparatus of claim 10, comprising first and second forearm driving pulleys non-rotationally coupled to the web.

18. The robot apparatus of claim 10, comprising an inner shaft coupling the second driven member to the second upper arm, and an outer shaft received over the inner shaft coupled to a first forearm driving pulley and a second forearm driving pulley.

* * * * *